United States Patent
Ryan (10) Patent No.: US 12,148,291 B2
(45) Date of Patent: Nov. 19, 2024

(54) SYSTEM TO CONTROL MULTIPLE DEVICES WITH A REMOTE CONTROL DEVICE

(71) Applicant: ARRIS Enterprises LLC, Suwanee, GA (US)

(72) Inventor: William R. Ryan, Los Angeles, CA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 17/666,008

(22) Filed: Feb. 7, 2022

(65) Prior Publication Data
US 2022/0262235 A1 Aug. 18, 2022

Related U.S. Application Data

(60) Provisional application No. 63/149,760, filed on Feb. 16, 2021.

(51) Int. Cl.
*G08C 23/04* (2006.01)
*G08C 17/02* (2006.01)

(52) U.S. Cl.
CPC .......... *G08C 23/04* (2013.01); *G08C 17/02* (2013.01); *G08C 2201/40* (2013.01); *G08C 2201/50* (2013.01); *G08C 2201/70* (2013.01)

(58) Field of Classification Search
CPC .... G08C 23/04; G08C 17/02; G08C 2201/40; G08C 2201/50; G08C 2201/70; H04N 21/42221; H04N 21/42226
See application file for complete search history.

(56) References Cited

U.S. PATENT DOCUMENTS

| | | | |
|---|---|---|---|
| 8,063,749 B2 | 11/2011 | Rye et al. | |
| 9,019,435 B2* | 4/2015 | Barnett | H04N 21/42204 |
| | | | 348/734 |
| 9,307,178 B2* | 4/2016 | Arling | H04N 5/60 |
| | (Continued) | | |

OTHER PUBLICATIONS

International Search Report and Written Opinion of International Searching Authority issued May 16, 2022 in International (PCT) Application No. PCT/US2022/015461.

(Continued)

*Primary Examiner* — Adnan Aziz
(74) *Attorney, Agent, or Firm* — Wenderoth, Lind & Ponack, L.L.P.

(57) ABSTRACT

A system and method are provided for a device for use with a primary device and a remote control device, the primary device being configured to perform a function, the remote control device including an infrared (IR) transmitter and a wireless transceiver. The IR transmitter is configured to transmit an IR signal based on the primary device control code, and the transceiver is configured to receive a wireless instruction signal. The device comprises a memory and a processor. The processor is configured to execute instructions stored on the memory to cause the device to: obtain primary device data associated with the primary device; generate the wireless instruction signal based on the primary device data; and transmit the wireless instruction signal to cause the remote control device to transmit the IR signal to instruct the primary device to perform the function.

12 Claims, 4 Drawing Sheets

(56) References Cited

U.S. PATENT DOCUMENTS

| | | | |
|---|---|---|---|
| 9,870,123 B1* | 1/2018 | Pope | G06F 3/0482 |
| 10,796,563 B1* | 10/2020 | Bell | G10L 15/22 |
| 10,880,494 B2* | 12/2020 | Marino | H04N 21/43615 |
| 11,776,388 B1* | 10/2023 | Chaboud | H04N 21/43615 |
| | | | 348/734 |
| 2001/0005197 A1* | 6/2001 | Mishra | H04N 21/42204 |
| | | | 348/E5.103 |
| 2005/0024226 A1* | 2/2005 | Hayes | H04L 12/40117 |
| | | | 340/12.28 |
| 2008/0065238 A1 | 3/2008 | Igoe | |
| 2012/0041925 A1* | 2/2012 | Pope | H04N 21/42221 |
| | | | 455/566 |
| 2012/0249890 A1* | 10/2012 | Chardon | H04N 21/43635 |
| | | | 348/734 |
| 2013/0107131 A1* | 5/2013 | Barnett | H04N 21/43615 |
| | | | 348/734 |
| 2013/0162412 A1* | 6/2013 | Yu | G08C 17/02 |
| | | | 340/12.5 |
| 2013/0249679 A1 | 9/2013 | Arling | |
| 2016/0142647 A1* | 5/2016 | Gopinath | H04N 21/43615 |
| | | | 348/706 |
| 2017/0048577 A1* | 2/2017 | Chiou | G08C 23/04 |
| 2017/0180899 A1 | 6/2017 | Proctor, Jr. et al. | |
| 2019/0043345 A1* | 2/2019 | Owrang | G08C 23/04 |
| 2019/0281341 A1* | 9/2019 | Lawrence | H04N 21/41265 |
| 2020/0128206 A1* | 4/2020 | Shin | G08C 23/04 |
| 2020/0204613 A1* | 6/2020 | Hatambeiki | G05B 15/02 |
| 2020/0280756 A1* | 9/2020 | Vurimi | H04N 21/42203 |
| 2020/0302932 A1* | 9/2020 | Schramm | H04M 3/42212 |
| 2021/0251028 A1* | 8/2021 | Song | H04W 8/005 |
| 2023/0049905 A1* | 2/2023 | Lee | H04N 21/42221 |

OTHER PUBLICATIONS

International Preliminary Report on Patentability and Written Opinion mailed Aug. 31, 2023 in International Application No. PCT/US2022/015461.

* cited by examiner

SYSTEM TO CONTROL MULTIPLE DEVICES WITH A REMOTE CONTROL DEVICE

BACKGROUND

Embodiments of the disclosure relate to controlling multiple devices with a remote control device.

SUMMARY

Aspects of the present disclosure are drawn to a device for use with a primary device and a remote control device, the primary device being configured to perform a function, the remote control device including an infrared (IR) transmitter and a wireless transceiver. The IR transmitter is configured to transmit an IR signal based on the primary device control code, and the transceiver is configured to receive a wireless instruction signal. The device includes a memory and a processor. The processor is configured to execute instructions stored on the memory to cause the device to: obtain primary device data associated with the primary device; generate the wireless instruction signal based on the primary device data; and transmit the wireless instruction signal to cause the remote control device to transmit the IR signal to instruct the primary device to perform the function.

In some embodiments, the device is for use with, as the primary device, one of the group consisting of a television, a set-top box, a streaming media device, an audio data playing device, a video data playing device, and an audio/video playing device.

In some embodiments, the processor is further configured to execute instructions stored on the memory to additionally cause the device to transmit the wireless instruction signal as a Bluetooth low energy signal.

In some embodiments, the remote control device has a primary device control code associated with the primary device stored therein. The processor is further configured to execute instructions stored on the memory to additionally cause the device to transmit the wireless instruction signal to cause the remote control device to transmit the IR signal based on the primary device control code to instruct the primary device to perform the function.

In some embodiments, the processor is further configured to execute instructions stored on the memory to additionally cause the device to obtain primary device data associated with the primary device from the primary device.

In some embodiments, the wireless instruction signal is at least one of a different frequency from the IR signal or a different protocol from the IR signal.

Other aspects of the present disclosure are drawn to a method of using a device with a primary device and a remote control device, the primary device being configured to perform a function, the remote control device including an infrared (IR) transmitter and a wireless transceiver. The IR transmitter is configured to transmit an IR signal based on the primary device control code and the transceiver is configured to receive a wireless instruction signal. The method includes obtaining, via a processor configured to execute instructions stored on a memory, primary device data associated with the primary device; generating, via the processor, the wireless instruction signal based on the primary device data; and transmitting, via the processor, the wireless instruction signal to cause the remote control device to transmit the IR signal to instruct the primary device to perform the function.

In some embodiments, the device is for use with, as the primary device, one of the group consisting of a television, a set-top box, a streaming media device, an audio data playing device, a video data playing device, and an audio/video playing device.

In some embodiments, transmitting the wireless instruction signal includes transmitting the wireless instruction signal as a Bluetooth low energy signal.

In some embodiments, the remote control device has a primary device control code associated with the primary device stored therein; and transmitting the wireless instruction signal includes transmitting the wireless instruction signal to cause the remote control device to transmit the IR signal based on the primary device control code to instruct the primary device to perform the function.

In some embodiments, obtaining the primary device data includes obtaining the primary device data associated with the primary device from the primary device.

In some embodiments, the wireless instruction signal is at least one of a different frequency from the IR signal or a different protocol from the IR signal.

Other aspects of the present disclosure are drawn to a non-transitory, computer-readable media having computer-readable instructions stored thereon, the computer-readable instructions being capable of being read by a device for use with a primary device and a remote control device. The primary device is configured to perform a function. The remote control device includes an infrared (IR) transmitter and a wireless transceiver. The IR transmitter is configured to transmit an IR signal based on the primary device control code. The transceiver is configured to receive a wireless instruction signal. The computer-readable instructions are capable of instructing the device to perform the method including: obtaining, via a processor configured to execute instructions stored on a memory, primary device data associated with the primary device; generating, via the processor, the wireless instruction signal based on the primary device data; and transmitting, via the processor, the wireless instruction signal to cause the remote control device to transmit the IR signal to instruct the primary device to perform the function.

In some embodiments, the computer-readable instructions are capable of instructing the device to perform the method wherein the device is for use with, as the primary device, one of the group consisting of a television, a set-top box, a streaming media device, an audio data playing device, a video data playing device, and an audio/video playing device.

In some embodiments, the computer-readable instructions are capable of instructing the device to perform the method wherein transmitting the wireless instruction signal includes transmitting the wireless instruction signal as a Bluetooth low energy signal.

In some embodiments, the computer-readable instructions are capable of instructing the device to perform the method wherein the remote control device has a primary device control code associated with the primary device stored therein, and wherein transmitting the wireless instruction signal includes transmitting the wireless instruction signal to cause the remote control device to transmit the IR signal based on the primary device control code to instruct the primary device to perform the function.

In some embodiments, the computer-readable instructions are capable of instructing the device to perform the method wherein obtaining the primary device data includes obtaining the primary device data associated with the primary device from the primary device.

In some embodiments, the computer-readable instructions are capable of instructing the device to perform the method wherein the wireless instruction signal is at least one of a different frequency from the IR signal or a different protocol from the IR signal.

BRIEF SUMMARY OF THE DRAWINGS

The accompanying drawings, which are incorporated in and form a part of the specification, illustrate example embodiments and, together with the description, serve to explain the principles of the present disclosure. In the drawings.

DETAILED DESCRIPTION

Televisions (TVs) are a ubiquitous part of today's households and offices. A single TV is often connected to multiple consumer electronics devices such as set-top boxes (STBs), DVD or Blu-Ray players, digital video recorders (DVRs), video conference devices, and speakers.

A problem arises because these consumer electronics devices are often of different brands and manufacturers, and are each controlled by their individual, unique remote control devices. A user who wants to, for example, switch the TV input from a Blu-ray player to a cable STB may: use the TV remote to select the proper input; use the STB remote to power on the STB and select the desired channel; use the TV remote to adjust audio volume; and use the Blu-ray player remote to eject the Blu-ray disc and power off the player.

Some existing systems employ universal remote control devices or remote IR transmitters in an attempt to simplify the number of remote control devices needed. However, these existing systems are often difficult to program and complicated to use. These will be described with reference to FIGS. 1A-B, which illustrate prior-art systems of controlling multiple devices with remote control devices and IR transmitters.

In particular, one solution to needing multiple remote control devices, each controlling a single consumer electronics device, is to employ a single universal remote control device. This will be described in greater detail with reference to FIG. 1A.

Figure 1A:
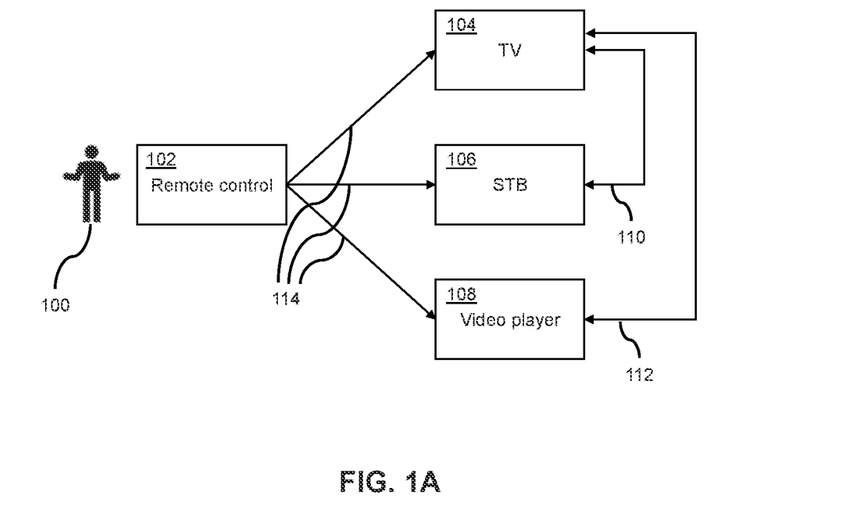
FIG. 1A illustrates a prior-art system of controlling multiple devices with a universal remote control device.

As shown in the figure, a user 100 uses a remote control device 102 to operate a TV 104, an STB 106, and a video player 108. A connection 110 links STB 106 to TV 104, and a connection 112 links video player 108 to TV 104. Remote control device 102 controls TV 104, STB 106, and video player 108 by way of an IR signal 114.

For purposes of discussion, let TV 104, STB 106, and video player 108 be manufactured by different companies and be controlled by IR signals with different frequencies or protocols. Remote control device 102 is a universal remote control device, wherein remote control device 102 contains all device codes needed to support various device models and manufacturers, including those of TV 104, STB 106, and video player 108. Therefore, user 100 can use remote control device 102 to operate any of TV 104, STB 106, and video player 108.

A problem with universal remote control devices such as remote control device 102 is that they require user 100 to program manufacturer and model number information of TV 104, STB 106, and video player 108 into remote control device 102 so that remote control device 102 can transmit the correct device codes over IR signal 114. This process is often complex and cumbersome. Moreover, universal remote control devices are often designed with many buttons arranged in dense layouts, which are difficult to understand and manipulate for certain population segments.

Figure 1B:
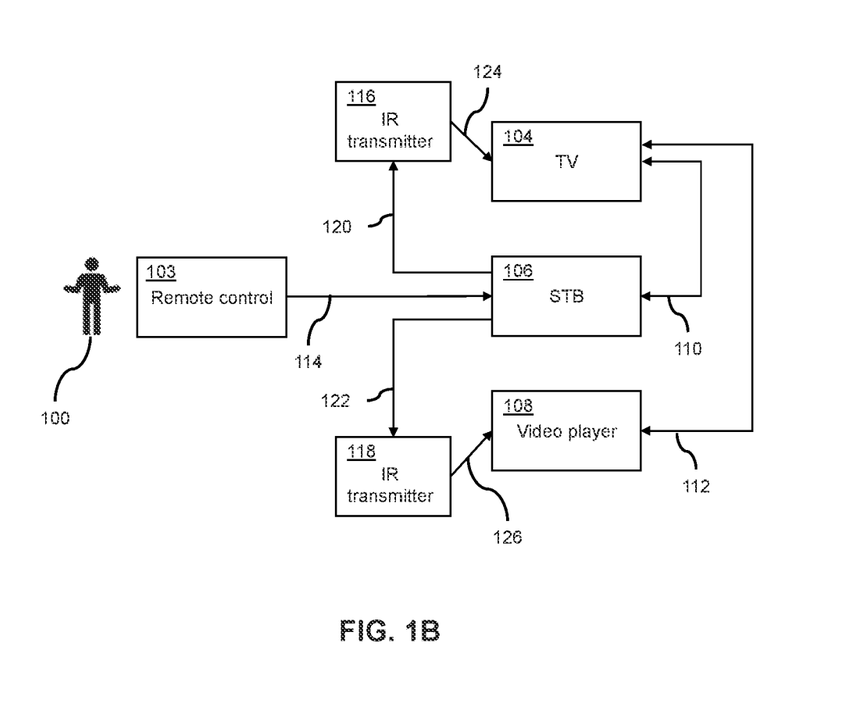
FIG. 1B illustrates a prior-art system of controlling multiple devices with IR transmitters.

FIG. 1B presents an alternate solution for multiple remote control devices. As shown in the figure, user 100 uses a remote control device 103 to operate TV 104, STB 106, and video player 108. Remote control device 103 communicates only with STB 106 by way of IR signal 114. STB 106 controls TV 104 using an IR transmitter 116 positioned adjacent to TV 104; STB 106 sends a signal 120 to IR transmitter 116, which then sends an IR signal 124 to TV 104. IR signal 124 contains devices codes, or device information, appropriate to the brand and model of TV 104. Similarly, STB 106 controls video player 108 using an IR transmitter 118 positioned adjacent to video player 108; STB 106 sends a signal 122 to IR transmitter 118, which then sends an IR signal 126 to video player 108. IR signal 126 contains devices codes appropriate to the brand and model of video player 108.

An advantage with this system is that STB 106 can be more intelligent than remote control device 103, can potentially derive manufacturer and model information directly from TV 104 or video player 108, or can update device code information from an external server. A disadvantage with this system is the additional wiring and careful positioning required by IR transmitters 116 and 118.

Other systems and methods, such as High-Definition Multimedia Interface Consumer Electronics Control (HDMI-CEC), have been proposed in order standardize the controlling of multiple devices. However, legacy devices that do not support HDMI-CEC cannot be controlled by the remote, and legacy devices are often included in systems. Moreover, HDMI-CEC is branded differently by each manufacturer, which causes confusion about compatibility between different devices.

What is needed is a system and method for simplifying the control of multiple consumer electronics devices.

A system and method in accordance with the present disclosure allows for the control of multiple consumer electronics devices with a device and its remote control device.

In accordance with the present disclosure, a device is used with a remote control device and one or more primary devices. Primary devices may be consumer electronic devices such as TVs, STBs, DVD or Blu-ray players, video streaming players, or gaming consoles. The remote control device includes a wireless transceiver and an IR transmitter. The wireless transceiver enables the remote control device to communicate with the device. The IR transmitter enables the remote control device to control the functions of one or more primary devices.

An example system and method for controlling multiple primary devices with a device and a remote control device in accordance with aspects of the present disclosure will now be described in greater detail with reference to FIGS. 2-4.

Figure 2:
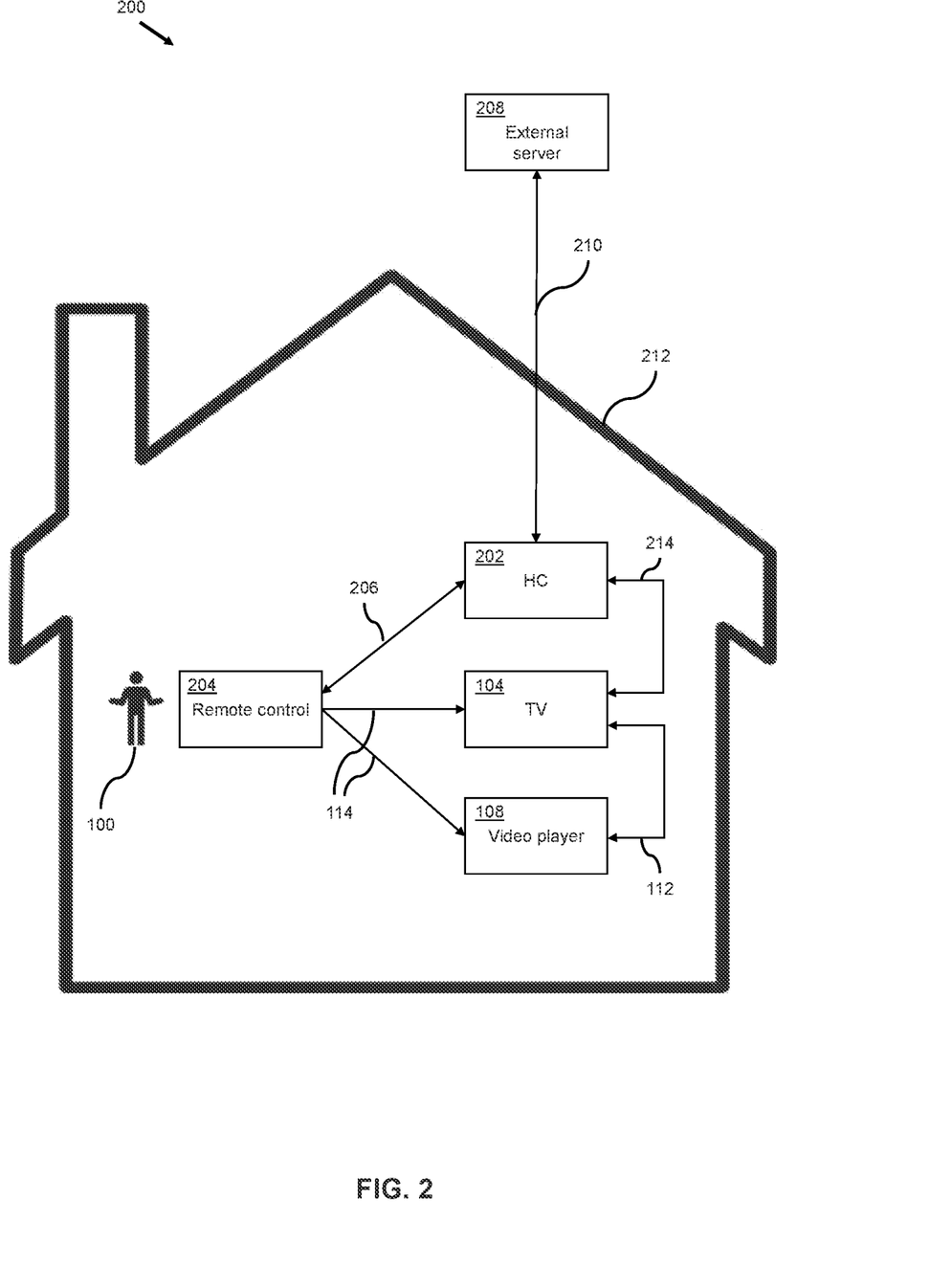
FIG. 2 illustrates a system of using a device and remote control device to control a primary device, in accordance with aspects of the present disclosure.

FIG. 2 illustrates a system 200, in accordance with aspects of the present disclosure.

As shown in the figure, system 200 includes user 100, a home camera (HC) 202, a remote control device 204, TV 104, video player 108, and an external server 208. User 100, HC 202, remote control device 204, TV 104, and video player 108 are disposed at a location 212. A connection 214 links TV 104 and HC 202. Connection 112 links video player 108 and TV 104. HC 202 and remote control device 204 communicate over a wireless signal 206. Remote control device 204 controls TV 104 and video player 108 over IR signal 114. HC 202 communicates with external server 208 over a communications channel 210.

HC 202 may be any device or system that is configured to perform a function, communicate with external server 208, and communicate with remote control device 204. In this non-limiting example, HC 202 is a home camera device that allows user 100 to conduct a video conference with other users who may be disposed outside location 212. HC 202 uses TV 104 as a display device. In another non-limiting example, HC 202 may be a set-top box.

Remote control device 204 may be any device or system that is configured to communicate with HC 202 over wireless signal 206 and communicate with TV 104 and video player 108 over IR signal 114. In this non-limiting example, remote control device 204 is a stand-alone remote control device, associated with consumer electronic devices such as televisions or video players. In another non-limiting example, remote control device 204 may be a smartphone.

TV 104 and video player 108 are examples of consumer electronic devices. Typical consumer electronic devices include televisions, video recorders, DVD players, Blu-ray players, video streaming players, STBs, sound bars, wireless speakers, smart media devices, and gaming consoles.

External server 208 may be any device or system that is configured to store, process, and communicate information. Though external server 208 is depicted as a single device external to location 212, it is contemplated that external server 208 may comprise multiple devices disposed in multiple locations.

Communications channel 210 may be any type of communication channel that facilitates communications between devices or networks. Communications channel 210 may include physical media or wiring, such as coaxial cable, optical fiber, or digital subscriber line (DSL); or wireless links, such as Wi-Fi, LTE, satellite, or terrestrial radio links; or a combination of any of these examples or their equivalents. The term "Wi-Fi" as used herein may be considered to refer to any of Wi-Fi 4, 5, 6, 6E, or any variation thereof. The data communicated on such networks can be implemented using a variety of protocols on a network such as a WAN, a virtual private network (VPN), a metropolitan area network (MAN), a system area network (SAN), a DOCSIS network, a fiber optics network (including fiber-to-the-home, fiber-to-the-X, or hybrid fiber-coax), a digital subscriber line (DSL), a public switched data network (PSDN), a global Telex network, or a 2G, 3G, 4G or 5G, for example. Though communications channel 210 is shown as a single link, it is contemplated that communications channel 210 may contain multiple links and devices, including access points, routers, gateways, and servers.

Wireless signal 206 may be any type of wireless signal that facilitates communications between HC 202 and remote control device 204. In this non-limiting example, wireless signal 206 is Bluetooth. The term "Bluetooth" as used herein may be considered to refer to Classic Bluetooth, Bluetooth high speed, or Bluetooth Low Energy (BLE) protocols, or any variation thereof.

IR signal 114 may be any type of IR signal that enables remote control device 204 to operate functions of TV 104 and video player 108 from a distance. In this non-limiting example, IR signal 114 is a low data-rate signal where device codes for TV 104 and video player 108 are modulated onto an infrared waveform, with carrier frequencies typically around 30-60 kHz.

Connections 112 and 214 may each be any type of connection that is configured to allow HC 202, TV 104, and video player 108 to transmit information to connected devices. Connections 112 and 214 may be analog or digital, uni- or bi-directional, and are typically based on standards used by consumer electronics devices. Non-limiting examples of connections 112 and 214 include HDMI, digital visual interface (DVI), DisplayPort, USB, component video, S-Video, composite video, optical audio such as TOSLINK, and analog audio.

In operation, user 100 uses remote control device 204 to operate HC 202, TV 104, and video player 108. For purposes of discussion, suppose that user 100 is watching a Blu-ray disc on video player 108 when a video conference call is received on HC 202. User 100 accepts the call by pressing a button on remote control device 204; this action is communicated to HC 202 over wireless signal 206. HC 202 sends a "switch source to HC" instruction over wireless signal 206 to remote control device 204. Remote control device 204 translates this instruction into appropriate device codes and sends these device codes over IR signal 114 to TV 104 and video player 108. Video player 108 pauses playback of the Blu-ray disc. TV 104 switches its input source to HC 202.

FIG. 2 describes system 200 where HC 202 and remote control device 204 are able to control one or more primary devices such as TV 104 and video player 108. A method of using a device and remote control device to control a primary device will now be discussed with reference to FIG. 3.

Figure 3:
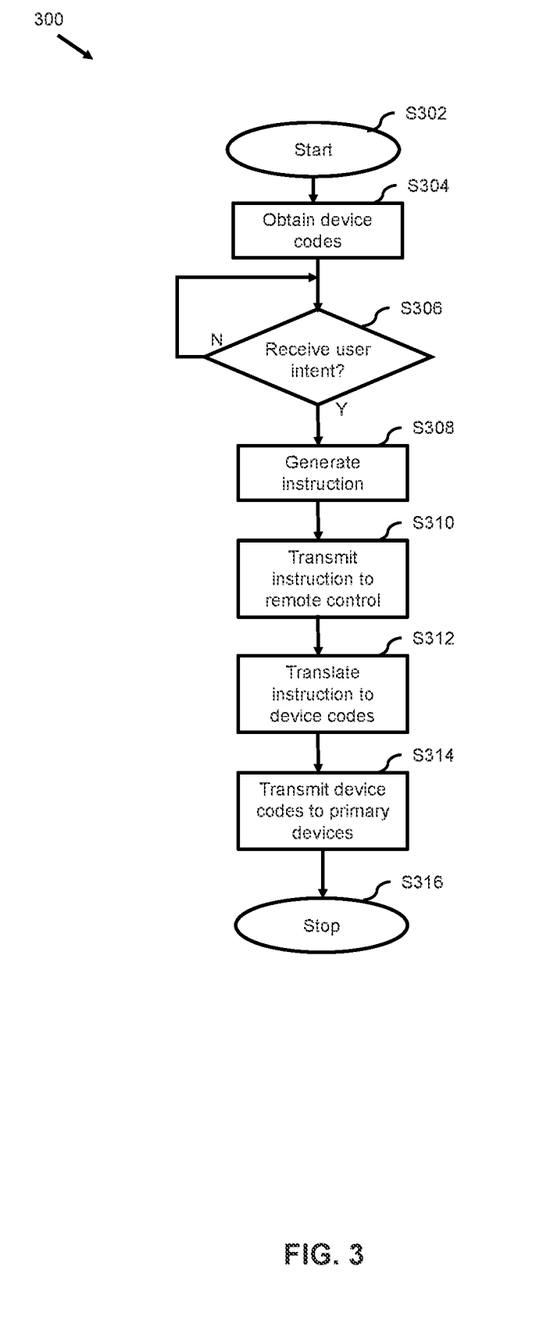
FIG. 3 illustrates a method of using a device and remote control device to control a primary device, in accordance with aspects of the present disclosure.

FIG. 3 illustrates an example method 300 of using a device and remote control device to control a primary device, in accordance with aspects of the present disclosure.

As shown in the figure, method 300 starts (S302) and device codes are obtained (S304). This will be described in greater detail with reference to FIG. 4.

Figure 4:
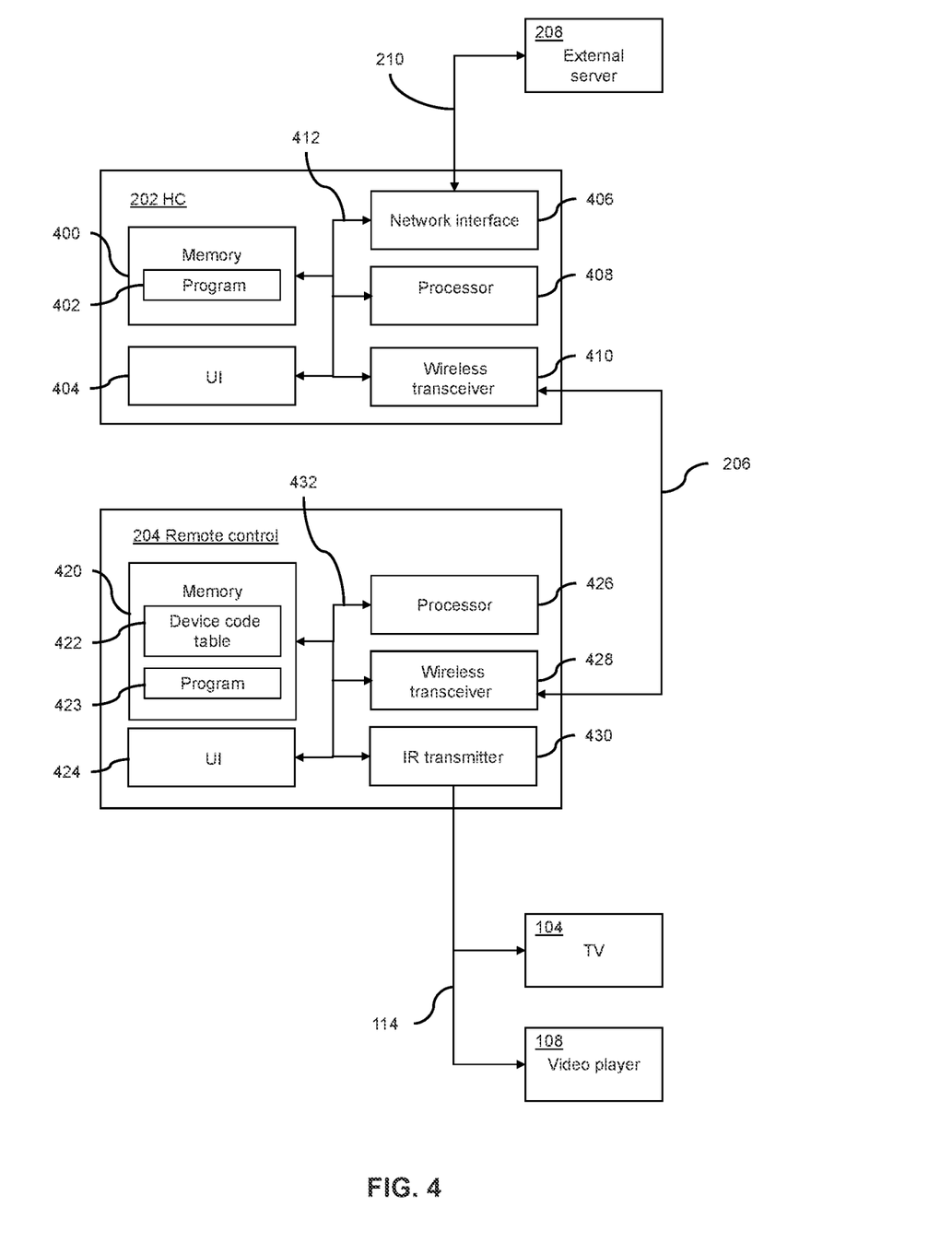
FIG. 4 illustrates a device, primary devices, a remote control device, and an external server, in accordance with aspects of the present disclosure.

FIG. 4 illustrates an exploded view of HC 202, an exploded view of remote control device 204, external server 208, TV 104, and video player 108 in accordance with aspects of the present disclosure.

As shown in the figure, HC 202 contains a memory 400, a user interface (UI) 404, a network interface 406, a processor 408, and a wireless transceiver 410. Memory 400, UI 404, network interface 406, processor 408, and wireless transceiver 410 are connected by bus 412.

In this example, memory 400, UI 404, network interface 406, processor 408, and wireless transceiver 410 are illustrated as individual devices. However, in some embodiments, at least two of memory 400, UI 404, network interface 406, processor 408, and wireless transceiver 410 may be combined as a unitary device. Further, in some embodiments, at least one of memory 400, UI 404, network interface 406, processor 408, and wireless transceiver 410 may be implemented as a computer having non-transitory computer-readable media for carrying or having computer-executable instructions or data structures stored thereon.

Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to, the tangible computer-readable media. In the alternative, the tangible computer-readable media may be integral to a processor. A processor and the tangible computer-readable media may reside in an integrated circuit (IC), an ASIC, or large scale integrated circuit (LSI), system LSI, super LSI, or ultra LSI components that perform a part or all of the functions described herein. In the alternative, a processor and the tangible computer-readable media may reside as discrete components.

Example tangible computer-readable media may be also coupled to systems, non-limiting examples of which include a computer system/server, which is operational with numerous other general-purpose or special-purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Processor 408 is configured to execute program 402 stored in memory 400. As will be described in greater detail below, in some embodiments, program 402 includes instructions, that when executed by processor 408, enable HC 202 to obtain primary device data associated with a primary device; generate wireless signal 206 as a wireless instruction signal based on the primary device data; and transmit the wireless instruction signal to cause remote control device 204 to transmit IR signal 114 to instruct the primary device to perform a function.

In some of these embodiments, as will be described in greater detail below, program 402 includes additional instructions, that when executed by processor 408, enable HC 202 to transmit the wireless instruction signal as a Bluetooth low energy signal.

In other embodiments, as will be described in greater detail below, wherein remote control device 204 has a primary device control code associated with the primary device stored therein, program 402 includes additional instructions, that when executed by processor 408, enable HC 202 to transmit the wireless instruction signal to cause remote control device 204 to transmit IR signal 114 based on the primary device control code to instruct the primary device to perform the function.

In other embodiments, as will be described in greater detail below, program 402 includes additional instructions, that when executed by processor 408, enable HC 202 to transmit the wireless instruction signal to cause remote control device 204 to obtain primary device data associated with the primary device from the primary device.

In other embodiments, as will be described in greater detail below, program 402 includes additional instructions, that when executed by processor 408, enable HC 202 to transmit the wireless instruction signal such that the wireless instruction signal is at least one of a different frequency from IR signal 114 or a different protocol from IR signal 114.

Remote control device 204 contains a memory 420, a UI 424, a processor 426, a wireless transceiver 428, and an IR transmitter 430. Memory 420, UI 424, processor 426, wireless transceiver 428, and IR transmitter 430 are connected by bus 432. Memory 420 includes a device code table 422 and a program 423 stored therein.

In this example, memory 420, UI 424, processor 426, wireless transceiver 428, and IR transmitter 430 are illustrated as individual devices. However, in some embodiments, at least two of memory 420, UI 424, processor 426, wireless transceiver 428, and IR transmitter 430 may be combined as a unitary device. Further, in some embodiments, at least one of memory 420, UI 424, processor 426, wireless transceiver 428, and IR transmitter 430 may be implemented as a computer having non-transitory computer-readable media for carrying or having computer-executable instructions or data structures stored thereon.

Processor 426 is configured to execute program 423 stored in memory 420.

Processors 408 and 426 may each be any device or system that is configured to control general operations of HC 202 and remote control device 204 respectively, and include, but are not limited to, central processing units (CPUs), hardware microprocessors, single-core processors, multi-core processors, field-programmable gate arrays (FPGAs), microcontrollers, application-specific integrated circuits (ASICs), digital signal processors (DSPs), or other similar processing devices capable of executing any type of instructions, algorithms, or software for controlling the operations and functions of HC 202 and remote control device 204.

Memories 400 and 420 may be any devices or systems configured to store data and instructions used by HC 202 and remote control device 204 respectively, and include, but are not limited to, random-access memory (RAM), dynamic random-access memory (DRAM), hard drives, solid-state drives, read-only memory (ROM), erasable programmable read-only memory (EPROM), electrically erasable programmable read-only memory (EEPROM), flash memory, embedded memory blocks in FPGAs, or any other various layers of memory hierarchy.

Network interfaces 406 may be any device or system that is configured to establish and maintain communications channel 210. Network interface 406 may include one or more antennas and communicate wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols.

Wireless transceivers 410 and 428 may each be any device or system that is configured to establish and maintain wireless signal 206. In this non-limiting example, wireless transceivers 410 and 428 are radio transceivers or wireless communication circuits that implement wireless connections in accordance with any Bluetooth protocols, Bluetooth Low Energy (BLE), or other short-range protocols that operate in accordance with a wireless technology standard for exchanging data over short distances using any licensed or unlicensed band such as the CBRS band, 2.4 GHz bands, 5 GHz bands, 6 GHz bands, or 60 GHz bands, RF4CE protocol, ZigBee protocol, Z-Wave protocol, or IEEE 802.15.4 protocol.

It should be noted that in accordance with aspects of the present disclosure, wireless transceivers 410 and 428 wirelessly communicate in a manner different from IR transmitter 430. In some embodiments, wireless transceivers 410 and 428 wirelessly communicate in a protocol that is different from that as used by IR transmitter 430. In some embodiments, wireless transceivers 410 and 428 wirelessly communicate on a frequency band that is different from that as used by IR transmitter 430. In some embodiments, wireless transceivers 410 and 428 wirelessly communicate on a frequency band that is different from that as used by IR transmitter 430 and wireless transceivers 410 and 428 wirelessly communicate in a protocol that is different from that as used by IR transmitter 430.

UIs 404 and 424 may each be any device or configured to present information and accept user inputs on HC 202 and remote control device 204 respectively, and include, but are not limited to, liquid crystal displays (LCDs), thin film transistor (TFT) displays, light-emitting diodes (LEDs), touch screens, buttons, microphones, and speakers.

IR transmitter 430 may be any device or system that is configured to create and modulate infrared waveforms that can be used to control TV 104 and video player 108. In this non-limiting example, IR transmitter 430 is an LED and its associated circuits.

Bus 412 may be any device or system that is configured to provide data communications between memory 400, UI 404, network interface 406, processor 408, and wireless transceiver 410 of HC 202. Bus 432 may be any device or system that is configured to provide data communications between memory 420, UI 424, processor 426, wireless transceiver 428, and IR transmitter 430 of remote control device 204. Buses 412 and 432 may be one or more of any of several types of bus structures, including a memory bus or a memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Program 402 operates the functions of HC 202, including communicating with external server 208 and remote control device 204, processing user intents, and generating device instructions. Program 402, having a set (at least one) of program modules, may be stored in memory 400 by way of example, and not limitation, as well as an operating system, one or more application programs, other program modules, and program data. Similarly, program 423 operates the functions of remote control device 204 and may be stored in memory 420 by way of example, and not limitation, as well as an operating system, one or more application programs, other program modules, and program data. Each of the operating systems, one or more application programs, other program modules, and program data or some combination thereof, may include an implementation of a networking environment. The program modules generally carry out the functions and/or methodologies of various embodiments of the application as described herein.

Device code table 422 is a non-limiting example of a data structure that is configured to map device instructions, such as powering on, into codes that can instruct a primary device of a specific brand and model number to perform that function. In this non-limiting example, device code table 422 is pre-programmed into memory 420 of remote control device 204. In another non-limiting example, device code table 422 can be updated from external server 208 via HC 202.

For purposes of discussion and referring to FIG. 2, suppose that user 100 is using at least one of remote control device 204, TV 104, and video player 108 for the first time within system 202. For example, remote control device 204 might be newly purchased for use with previously installed TV 104 and video player 108. Or, for example, remote control device 204 might be previously used with previously installed video player 108, whereas TV 104 is newly purchased. In any situation, user 100 is using at least one of remote control device 204, TV 104, and video player 108 for the first time within system 202, remote control device 204 should be programmed to control both TV 104 and video player 108.

As shown in FIG. 4, in some embodiments remote control device 204 may be pre-programmed in device code table 422 with device codes able to control a wide variety of primary devices. Remote control device 204 needs to be made aware specifically of TV 104 and video player 108 in order to use the correct device codes. In this non-limiting example, HC 202 is connected to TV 104 via connection 214.

In some embodiments, TV 104 may have device information of TV 104 stored therein, whereas video player 108 may have device information of video player 108 stored therein. The device information may include information identifying the device so as to enable programming of remote control 204. Non-limiting examples of types of information within device information include the brand, model, serial number and combinations thereof. Network interface 406 of HC 202 may automatically obtain device information of TV 104 directly from TV 104 and device information of video player 108 directly from video player 108.

In other embodiments, user 100 may have a user account in external server 208, wherein device information of TV 104 and device information of video player 108 is stored in external server. In these embodiments, network interface 406 of HC 202 may automatically obtain device information of TV 104 and device information of video player 108 from external server 208.

In other embodiments, user 100 may enter device information of TV 104 and device information of video player 108 into HC 202 via UI 404. In some non-limiting example embodiments, user 100 may recites brand and model number using a voice input capability of UI 404. In another non-limiting example, user 100 selects brand and model number by pressing certain buttons on UI 404.

Once HC 202 has the device information, processor 408 instructs wireless transceiver 410 to transmit the device information to remote control device 204 over wireless signal 206.

Returning to FIG. 3, a user intent is received (S306). For purposes of discussion and returning to FIG. 2, suppose that user 100 is watching a Blu-ray disc on video player 108 when a video conference call is received on HC 202. User 100 accepts the call by pressing a button on remote control device 204 (Y at S306). If there is no action (N at S306), method 300 waits for a user intent.

Returning to FIG. 3, after a user intent is received (Y at S306), an instruction is generated (S308). This will now be discussed in greater detail with reference to FIGS. 2 and 4.

Referring to FIG. 2 and following the example scenario wherein user 100 presses a button on remote 204 to accept a video conference call. Referring to FIG. 4, processor 426 on remote control device 204 sends an indication that a button has been pressed using wireless transceiver 428 to communicate over wireless signal 206. HC 202 receives this indication on wireless transceiver 410. Program 402 running on processor 408 then generates an instruction for TV 104 to switch its input source from video player 108 to HC 202.

Returning to FIG. 3, after the instruction is generated (S308), an instruction signal is transmitted to the remote control device (S310). Referring to FIG. 4, processor 408 of HC 202 instructs wireless transceiver 410 to transmit the instruction signal over wireless signal 206 to remote control device 204. Wireless transceiver 428 of remote control device 204 then provides the received instruction signal to processor 426.

Returning to FIG. 3, after the instruction signal is transmitted (S310), the instruction is translated to the appropriate device codes (S312). Referring to FIG. 4, processor 426 executes instructions in program 423 so as to examines device code table 422 and translate the instruction into device codes that are specific to TV 104.

Returning to FIG. 3, after the instruction is translated (S312), device codes are transmitted to primary devices (S314). Referring to FIG. 4, processor 426 executes instructions in program 423 to instruct IR transmitter 430 to send device codes to TV 104 by way of IR signal 114. Referring to FIG. 2 and the example scenario, remote control device 204 sends a code to TV 104 on IR signal 114 that causes TV 104 to switch its input source from video player 108 to HC 202. Remote control device 204 also sends a code to video player 108 on IR signal 114 that causes video player 108 to pause playback of its video content. User 100 can then proceed with the video conference and method 300 ends (S316).

Televisions are a common consumer electronic device in many households and offices, and each TV is often attached to other consumer electronics devices such as STBs, video disc players, video streaming players, smart speakers, and gaming consoles. Many consumer electronic devices are accompanied by their own remote control devices, resulting in a scenario where multiple remote control devices must be operated in order to accomplish a user intention. Several existing products, such as universal remotes and IR blasters, attempt to simplify this problem. However, universal remotes and IR blasters can themselves be complex to set up and use.

In accordance with the present disclosure, a device is used with a remote control device to operate other primary devices such as TVs, STBs, and video players. A user registers their intent by interacting with the remote control device's UI; for example, the user may push a button or speak a verbal command. The remote control device wirelessly communicates with the device to translate the user intent into primary device codes. In an example embodiment, the communication between the device and the remote control device is performed via a Bluetooth protocol. Then the remote control device uses an IR transmitter to transmit these primary device codes to the appropriate primary devices. It should be noted that in other embodiments, the communication between the device and the remote control device are not performed via a Bluetooth protocol, but are performed using a different type of transmission as that used by the IR transmitter. More generally speaking, the wireless instruction signal from the device to the remote control device differs from the transmission from the IR transmission in at least different frequency or protocol.

The foregoing description of various preferred embodiments have been presented for purposes of illustration and description. It is not intended to be exhaustive or to limit the present disclosure to the precise forms disclosed, and obviously many modifications and variations are possible in light of the above teaching. The example embodiments, as described above, were chosen and described in order to best explain the principles of the present disclosure and its practical application to thereby enable others skilled in the art to best utilize the present disclosure in various embodiments and with various modifications as are suited to the particular use contemplated. It is intended that the scope of the present disclosure be defined by the claims appended hereto.

What is claimed is:

1. A device at a location for use with a primary device at the location, an external server at a different location from the location, and a remote control device at the location, the primary device being configured to perform one or more functions, the remote control device including an infrared (IR) transmitter and a wireless transceiver, the IR transmitter being configured to transmit an IR signal based on the primary device control code, the transceiver being configured to receive a wireless instruction signal, the device comprising:
   a memory; and
   a processor configured to execute instructions stored on the memory to cause the device to:
      update a device code table of the remote control device via the external server, the device code table is configured to map one or more device instructions into one or more codes associated with the one or more functions of the primary device;
      obtain, from the primary device, primary device data associated with the primary device;
      receive a user intent from the remote control device;
      generate the wireless instruction signal based on the primary device data and the received user intent; and
      transmit the wireless instruction signal as a Bluetooth low energy signal to cause the remote control device to translate the wireless instruction signal into at least one of the one or more codes specific to the primary device and to transmit the IR signal to instruct the primary device to perform at least one function of the one or more functions.

2. The device of claim 1, wherein the device is for use with, as the primary device, one of the group consisting of a television, a set-top box, a streaming media device, an audio data playing device, a video data playing device, and an audio/video playing device.

3. The device of claim 1, wherein the remote control device has a primary device control code associated with the primary device stored therein and wherein the processor is further configured to execute instructions stored on the memory to additionally cause the device to transmit the wireless instruction signal to cause the remote control device to transmit the IR signal based on the primary device control code to instruct the primary device to perform the at least one function.

4. The device of claim 1, wherein the wireless instruction signal is at least one of a different frequency from the IR signal or a different protocol from the IR signal.

5. A method of using a device at a location with a primary device at the location, an external server at a different location from the location, and a remote control device at the location, the primary device being configured to perform one or more functions, the remote control device including an infrared (IR) transmitter and a wireless transceiver, the IR transmitter being configured to transmit an IR signal based on the primary device control code, the transceiver being configured to receive a wireless instruction signal, the method comprising:
update a device code table of the remote control device via the external server, the device code table is configured to map one or more device instructions into one or more codes associated with the one or more functions of the primary device;
obtaining, from the primary device via a processor configured to execute instructions stored on a memory, primary device data associated with the primary device;
receiving a user intent from the remote control device;
generating, via the processor, the wireless instruction signal based on the primary device data and the received user intent; and
transmitting, via the processor, the wireless instruction signal as a Bluetooth low energy signal to cause the remote control device to translate the wireless instruction signal into at least one of the one or more codes specific to the primary device and to transmit the IR signal to instruct the primary device to perform at least one function of the one or more functions.

6. The method of claim 5, wherein the device is for use with, as the primary device, one of the group consisting of a television, a set-top box, a streaming media device, an audio data playing device, a video data playing device, and an audio/video playing device.

7. The method of claim 5,
wherein the remote control device has a primary device control code associated with the primary device stored therein, and
wherein the transmitting the wireless instruction signal comprises transmitting the wireless instruction signal to cause the remote control device to transmit the IR signal based on the primary device control code to instruct the primary device to perform the function.

8. The method of claim 5, wherein the wireless instruction signal is at least one of a different frequency from the IR signal or a different protocol from the IR signal.

9. A non-transitory, computer-readable media of a device at a location having computer-readable instructions stored thereon, the computer-readable instructions being capable of being read by the device for use with a primary device at the location, an external server at a different location from the location, and a remote control device at the location, the primary device being configured to perform one or more functions, the remote control device including an infrared (IR) transmitter and a wireless transceiver, the IR transmitter being configured to transmit an IR signal based on the primary device control code, the transceiver being configured to receive a wireless instruction signal, wherein the computer-readable instructions are capable of instructing the device to perform the method comprising:
update a device code table of the remote control device via the external server, the device code table is configured to map one or more device instructions into one or more codes associated with the one or more functions of the primary device;
obtaining, from the primary device via a processor configured to execute instructions stored on a memory, primary device data associated with the primary device;
receive a user intent from the remote control device;
generating, via the processor, the wireless instruction signal based on the primary device data and the received user intent; and
transmitting, via the processor, the wireless instruction signal as a Bluetooth low energy signal to cause the remote control device to translate the wireless instruction signal into at least one of the one or more codes specific to the primary device and to transmit the IR signal to instruct the primary device to perform at least one function of the one or more functions.

10. The non-transitory, computer-readable media of claim 9, wherein the computer-readable instructions are capable of instructing the device to perform the method wherein the device is for use with, as the primary device, one of the group consisting of a television, a set-top box, a streaming media device, an audio data playing device, a video data playing device, and an audio/video playing device.

11. The non-transitory, computer-readable media of claim 9, wherein the computer-readable instructions are capable of instructing the device to perform the method
wherein the remote control device has a primary device control code associated with the primary device stored therein, and
wherein the transmitting the wireless instruction signal comprises transmitting the wireless instruction signal to cause the remote control device to transmit the IR signal based on the primary device control code to instruct the primary device to perform the function.

12. The non-transitory, computer-readable media of claim 9, wherein the computer-readable instructions are capable of instructing the device to perform the method wherein the wireless instruction signal is at least one of a different frequency from the IR signal or a different protocol from the IR signal.

* * * * *